(12) United States Patent
Eppink

(10) Patent No.: US 7,104,345 B2
(45) Date of Patent: Sep. 12, 2006

(54) DOWNHOLE ROTATABLE-SHAFT CONNECTOR ASSEMBLY AND METHOD

(75) Inventor: Jay Milton Eppink, Spring, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 163 days.

(21) Appl. No.: 10/873,606

(22) Filed: Jun. 22, 2004

(65) Prior Publication Data

US 2005/0279513 A1    Dec. 22, 2005

(51) Int. Cl.
*E21B 17/046* (2006.01)
(52) U.S. Cl. .................... 175/61; 175/320; 175/74
(58) Field of Classification Search ................. 175/61, 175/74, 320; 285/330; 464/18, 149, 158
See application file for complete search history.

(56) References Cited

U.S. PATENT DOCUMENTS

| 2,843,399 | A | * | 7/1958 | Arterbury et al. ........ 285/330 |
| 4,508,182 | A | * | 4/1985 | Anders .................. 175/61 |
| 4,745,982 | A | | 5/1988 | Wenzel |
| 4,817,740 | A | | 4/1989 | Beimgraben |
| 5,052,501 | A | | 10/1991 | Wenzel et al. |
| 5,094,305 | A | | 3/1992 | Wenzel |
| 5,101,914 | A | | 4/1992 | Wenzel |
| 5,125,463 | A | | 6/1992 | Livingstone et al. |
| 5,343,996 | A | | 9/1994 | Nuschak |
| 5,474,334 | A | | 12/1995 | Eppink |
| 6,325,162 | B1 | | 12/2001 | Eppink et al. |
| 6,543,556 | B1 | | 4/2003 | Anderson |
| 6,594,881 | B1 | * | 7/2003 | Tibbitts .................. 464/18 |

FOREIGN PATENT DOCUMENTS

| CA | 1243663 | 10/1988 |
| CA | 2025653 | 3/1992 |
| CA | 2030163 | 8/1995 |
| CA | 2022452 | 12/1995 |
| EP | 0561072 A1 | 9/1993 |

* cited by examiner

*Primary Examiner*—David Bagnell
*Assistant Examiner*—Matthew J. Smith

(57) ABSTRACT

A connector assembly for connecting with a rotatable shaft is provided. The connector assembly includes a mating sleeve threadably coupleable about the shaft and a center sleeve sized and shaped for deployment between the shaft and the mating sleeve. The center sleeve includes pluralities of splines formed on inner and outer surfaces thereof. The splines on the inner surface of the center sleeve are engageable with splines on the outer surface of the shaft and the splines on the outer surface of the center sleeve are engageable with splines on the inner surface of the mating sleeve. Exemplary embodiments of this invention are useful in downhole tools to reduce make-up torque requirements of the mating sleeve, and therefore may advantageously increase the cyclic torsional and/or bending load capacity of the shaft, while also increasing the total torsional load capacity of the connection.

34 Claims, 4 Drawing Sheets

US 7,104,345 B2

DOWNHOLE ROTATABLE-SHAFT CONNECTOR ASSEMBLY AND METHOD

FIELD OF THE INVENTION

The present invention relates generally to a connector assembly. More particularly, this invention relates to a connector assembly for connecting a sleeve to a rotatable shaft. Exemplary embodiments of this invention may advantageously increase the torsional and/or bending load bearing capacity of the shaft as compared to the prior art.

BACKGROUND OF THE INVENTION

In downhole drilling applications, torque is often transferred from a power source at the surface to a drill bit. In such applications, the torque is conventionally transferred through the shafts and/or cylindrical tubes that make up the drill string. In other downhole drilling applications, torque may be transferred from a downhole drilling motor to the drill bit. In such applications, the torque is transferred through the shafts and/or cylindrical tubes deployed between the drilling motor and the drill bit.

In either of these downhole drilling arrangements, the shafts and/or cylindrical tubes deployed between the power source and the drill bit must also typically accommodate significant bending loads, such as are commonly encountered in deviated boreholes. Such torsional and bending loads must typically be transferred through joints (e.g., threaded box and pin connections) at which adjacent components (e.g., drill string tubes) are connected.

In certain downhole applications, torque is transferred from a cylindrical tube (such as the tubes that make up the drill string) to a shaft (such as a rotatable shaft in a downhole tool). One common way to accommodate torsional and bending loads in such applications is to thread a mating sleeve to the shaft and tighten it (with sufficient torque to withstand anticipated torsional and bending loads) against a shoulder on the outer diameter of the shaft. Alternatively, another common approach includes using a second threaded sleeve as a shoulder. The mating sleeve is then tightened against the second sleeve (e.g., similar to a conventional locking nut). While such methods have been utilized to connect shafts and sleeves in various drilling operations, one drawback is that they typically require the sleeves to be tightened with a make up torque equal to about one-half the torsion yield of the connector (e.g., to about 45,000 foot pounds in common downhole applications). The use of such a high make up torque increases the stresses in the shaft and sleeves and thus tends to limit the bending and torsion loads that they may safely withstand.

Locking devices for downhole box and pin connectors are also known in the prior art. FIG. 1 shows one such prior art locking device that includes three cylindrical sleeves 75, 90, and 95 deployed coaxially about the box 80 and pin 70. Torque sleeve 75 includes a plurality of dogs 73 formed on an inner surface thereof and is configured to engage corresponding slots 72 formed on an outer surface of the pin member 70. Slide sleeve 95 includes a plurality of dogs 83 formed on an inner surface thereof is configured to engage slots 82 formed on an outer surface of the box member 80. Alignment sleeve 90 includes first and second sets of radial splines 79 and 91 formed on an internal surface thereof. The first set 79 includes 41 splines and is configured to engage splines 78 formed on an outer surface of torque ring 75. The second set 91 includes 40 splines and is configured to engage splines 92 formed on an outer surface of the slide ring 95. As such, the pin member 70 is rotationally coupled to the box member 80 when spines 78 and 79 and splines 91 and 92 are engaged.

With continue reference to FIG. 1, the locking device is made up about the connection by deploying the torque sleeve 75 about pin member 70 with dogs 73 engaged with slots 72. Alignment sleeve 90 and slide sleeve 95 are deployed about box member 80 with dogs 83 engaged with slots 82. The pin member 70 is then threaded to box member 80 (with threads 71 engaging threads 81) and tightened to a predetermined torque. A spacer (not shown) is translated into place and holds torque sleeve 75 firmly in place against shoulder 85 of box member 80. The alignment sleeve 90 is then rotated between the torque ring 75 and slide sleeve 95 until splines 78 and 79 and splines 91 and 92 are aligned. The slide sleeve is then translated axially towards the torque ring such that splines 78 and 79 and splines 91 and 92 engage. One or more soft nails are then driven into grooves 98 to hold sleeves 75, 90, and 95 together.

Another prior art locking device for a downhole box and pin connector includes two sleeves deployed coaxially about the threaded box member. The first sleeve includes four large axial dogs on one axial face disposed to engage four corresponding radial slots disposed on the outer surface of the box member. The second sleeve includes a plurality of axial splines configured to engage with corresponding axial splines disposed on a shoulder portion of the threaded pin member. The sleeves are further disposed to engage one another via a plurality of interlocking axial splines. As such, the box member may be rotationally coupled to the pin member when the first and second sleeves are engaged. The second sleeve includes 19 axial splines on one axial face and 20 axial splines on the opposing axial face. The locking device further includes a covering member deployed about the first and second sleeves. The covering member is intended to provide axial support for the first and second sleeves and is held in place by a soft nail pressed into a circumferential groove in the shoulder portion of the pin member.

The above-described connector assemblies, while potentially serviceable, are complex (e.g., including three splined sleeves nailed together and held in place by a spacer or including two splined sleeves with an encircling cover nailed in place). Moreover, the above described connector assemblies do not efficiently utilize the available diametrical space. For example, in both assemblies the sleeves are deployed about the box and pin members, thereby reducing the maximum outer diameter of the box and pin members. Such a reduced outer diameter tends to reduce the strength of the connection. Therefore, there exists a need for improved connector assemblies for downhole drilling tools. In particular, there exists a need for connector assemblies for connecting a mating sleeve to a rotatable shaft that are suitable to support large torsional and/or bending loads, often cyclic in nature, and that efficiently utilize the diametrical space available in the downhole tool.

SUMMARY OF THE INVENTION

The present invention addresses one or more of the above-described drawbacks of the prior art. Aspects of this invention include generally an apparatus for connecting a mating sleeve to an end of a threaded shaft. The shaft includes a plurality of splines formed on an outer surface thereof. The mating sleeve may be threadably coupled to the shaft and includes a plurality of splines formed on an inner surface thereof. The apparatus further includes a center sleeve deployed between the shaft and the mating sleeve. The center sleeve includes a plurality of splines formed on an inner surface thereof sized and shaped for engagement with the splines on the shaft. The center sleeve further includes a plurality of splines formed on the outer surface thereof sized and shaped for engagement with the splines on the inner surface of the mating sleeve. In certain exemplary embodiments of this invention, the center sleeve may include a different number of splines on the inner and outer surfaces (e.g., 30 splines on the inner surface and 29 splines on the outer surface).

Exemplary embodiments of the present invention advantageously provide several technical advantages. Various embodiments of this invention reduce the make-up torque requirements of the mating sleeve and therefore may advantageously increase the cyclic torsional and/or bending load capacity of the shaft. Various embodiments also increase the total torsional load capacity of the connection. Furthermore, embodiments of this invention more efficiently utilize available diametrical space. As such, the diameter of the torquing shoulder and the box and pin members may be greater than that in the prior art, thereby enabling them to support greater torsional and bending loads. Moreover, as described more detail below, certain embodiments of this invention may advantageously be utilized on opposing ends of a shaft on a downhole tool. As such, tool maintenance may be simplified since the tool may be assembled and disassembled from either end.

In one aspect the present invention includes a connector assembly for a downhole tool. The connector assembly connects to a rotatable shaft in which the shaft includes a plurality of radial splines formed on an outer surface thereof. The connector assembly includes a mating sleeve having a plurality of radial splines formed on an inner surface thereof. The mating sleeve is further threadably coupleable about the shaft. The connector assembly also includes a center sleeve sized and shaped for deployment between the shaft and the mating sleeve. The center sleeve includes a first plurality of radial splines formed on an inner surface thereof. The first plurality of radial splines are sized and shaped for engagement with the plurality of splines on the shaft. The center sleeve further includes a second plurality of radial splines formed on an outer surface thereof. The second plurality of radial splines are sized and shaped for engagement with the plurality of splines on the mating sleeve.

In another aspect this invention includes a downhole steering tool. The steering tool comprises a rotatable shaft rotatably deployed within a substantially non rotatable steering tool body, the shaft having longitudinally opposed first and second ends, each of said ends providing a plurality of shaft splines extending radially outward from an outer surface of the shaft. The steering tool further comprises first and second connector assemblies, one each of the connector assemblies connected to a corresponding one of the ends of the shaft. Each connector assembly comprises a shaft sleeve threadably coupled to the end of the shaft, a mating sleeve also threadably coupled the end of the shaft and tightened against the shaft sleeve, the mating sleeve further including a plurality of mating sleeve splines extending radially inward from an inner surface thereof. Each connector assembly further comprises a center sleeve also received on the end of the shaft via splined engagement with the shaft splines. The center sleeve includes a plurality of inner radial splines formed on an inner surface thereof, the inner radial splines sized and shaped for engagement with the shaft splines. The center sleeve further includes a plurality of outer radial splines formed on an outer surface thereof, the outer radial splines sized and shaped for engagement with the mating sleeve splines. The mating sleeve is further received on the center sleeve via splined engagement between the mating sleeve splines and the outer radial splines of the center sleeve.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
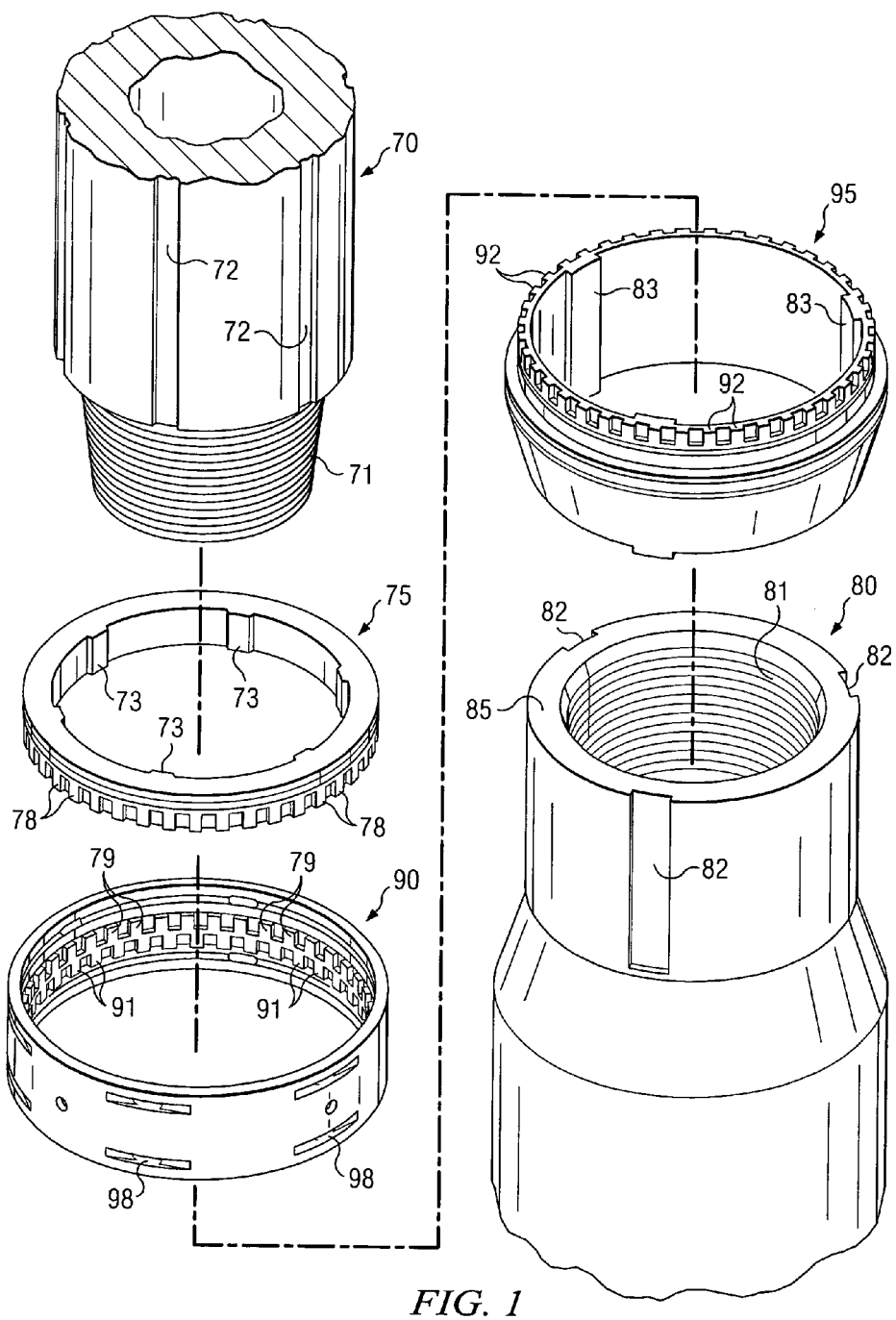
FIG. 1 depicts an exploded view of a prior art locking device for a box and pin connection.
Figure 2:
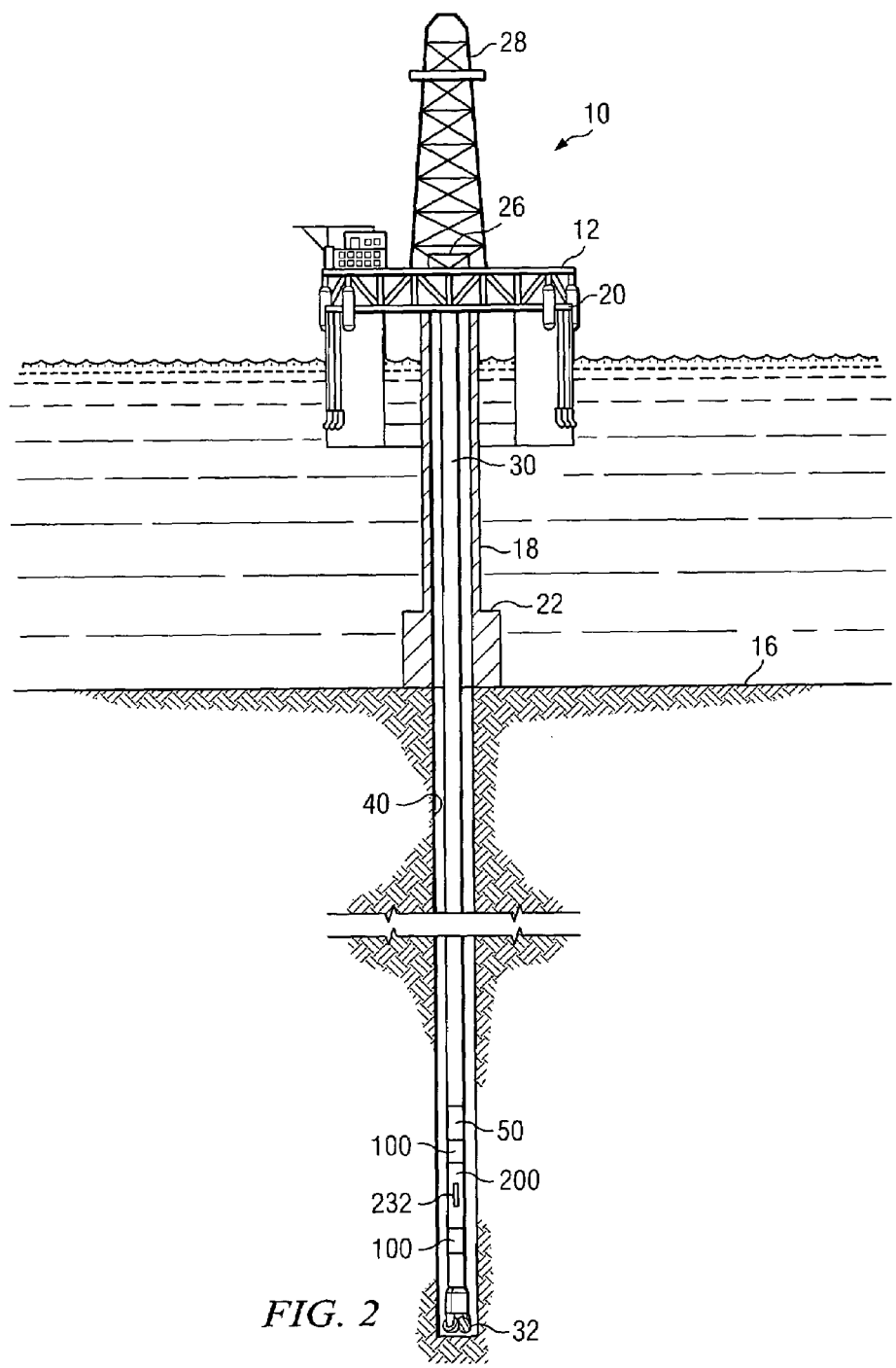
FIG. 2 depicts an offshore oil and/or gas drilling platform utilizing an exemplary embodiment of the present invention.
Figure 3:
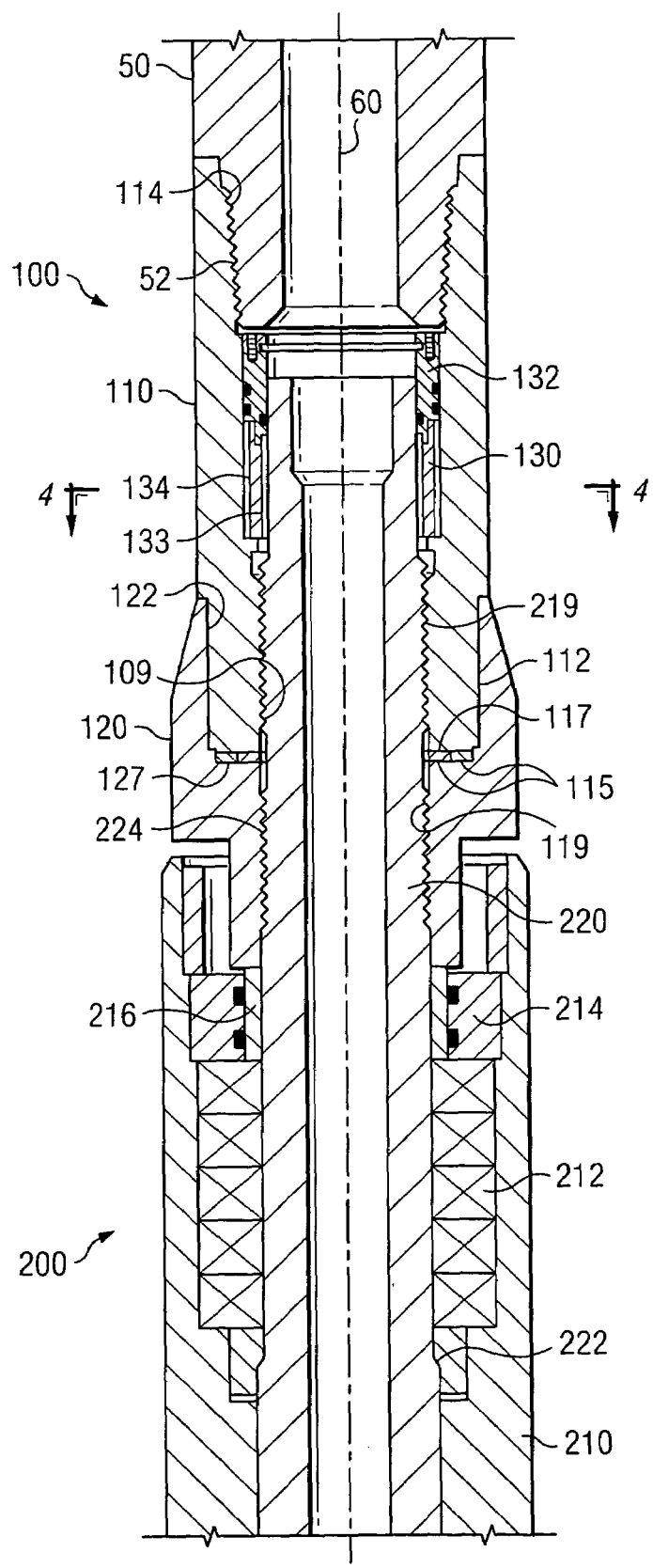
FIG. 3 depicts a one exemplary embodiment of a connector assembly according to the present invention.

FIG. 2 schematically illustrates one exemplary embodiment of a connector assembly 100 according to this invention in use in an offshore oil and/or gas drilling assembly, generally denoted 10. In FIG. 2, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit assembly 32 and a downhole steering tool 200 including one or more force application members 232. Steering tool 200 is shown coupled to a downhole sub 50 (e.g., a cross over sub or a section of drill pipe) via connector assembly 100. It will be appreciated that connector assembly 100 may be utilized to couple substantially any downhole components (such as measurement tools, steering tools, stabilizers, subs, and various sections of drill pipe) and therefore many be deployed at substantially any location in the drill string 30. As shown in FIGS. 2 and 3, in certain applications the connector assembly 100 may be advantageously utilized to couple a downhole steering tool to one or more downhole subs. It will also be appreciated that connector assembly 100 may be utilized on opposing ends of a downhole tool (e.g., to connect a sub to an upper end of steering tool 200 and a drill bit assembly 32 to a lower end of steering tool 200). Drill string 30 may further include a downhole drill motor, a mud pulse telemetry system, and one or more sensors, such as LWD and/or MWD tools for sensing downhole characteristics of the borehole and the surrounding formation.

It will be understood by those of ordinary skill in the art that the deployment illustrated on FIG. 2 is merely exemplary for purposes of the invention set forth herein. It will be further understood that the connector assembly 100 of the present invention is not limited to use with a semisubmersible platform 12 as illustrated on FIG. 2. Connector assembly 100 is equally well suited for use with any kind of subterranean drilling operation, either offshore or onshore.

It will be further understood that the present invention is also not limited to subterranean drilling applications. Embodiments of the invention include a connector assembly that facilitates increased torsion and bending capacity in any shaft comprising connected joints.

Referring now to FIG. 3, a longitudinal cross section of one exemplary embodiment of a connector assembly 100 according to the present invention is shown. As shown in FIG. 3 (and described above with respect to FIG. 2), one exemplary application is depicted in which a downhole steering tool 200 is coupled to a downhole sub 50 via connector assembly 100. In the exemplary embodiment shown, connector assembly 100 includes a mating sleeve 110 deployed about cylindrical shaft 220 of steering tool 200 and threadably coupled with downhole sub 50 via a conventional box 114 and pin 52 connection. In the embodiment shown, mating sleeve 110 includes a threaded inner surface 109 for threadably coupling with a threaded outer surface 219 of cylindrical shaft 220. Connector assembly 100 further includes a center sleeve 130 deployed between the cylindrical shaft 220 and the mating sleeve 110. The center sleeve 130 is rotationally engaged with cylindrical shaft 220 and mating sleeve 110 via radial splines 136, 138 (shown on and described in more detail below with respect to FIG. 4) on its inner 133 and outer 134 surfaces, respectively.

With continued reference to FIG. 3, cylindrical shaft 220 is disposed to rotate about axis 60 in the substantially non-rotating housing 210 of steering tool 200. In the embodiment shown, the steering tool 200 further includes a bearing assembly 212 and a sealing assembly 214 deployed about shaft 220. A shaft sleeve 120 is threadably engaged with cylindrical shaft 220 via threads 119 and 224. In the embodiment shown, shaft sleeve 120 is tightened against bearing spacer 216 (e.g., to a torque of about 5,000 foot pounds) to tighten bearings 212 against shoulder 222 of the cylindrical shaft 220. Mating sleeve 110 is then threadably engaged with cylindrical shaft 220 (as described above) and tightened against shaft sleeve 120. In the embodiment shown, a portion 112 of the mating sleeve 110 having a reduced outer diameter is received in an enlarged counter bore 122 of the shaft sleeve. One or more compression sleeves 115 may be optionally deployed between a lower end 117 of the mating sleeve 110 and an interior shoulder 127 of shaft sleeve 120. Such compression sleeve(s) 115 may be advantageously fabricated, for example, from a beryllium copper alloy. The mating sleeve 110 is typically tightened sufficiently such that a predetermined maximum bending load (e.g., determined from a maximum dogleg severity of a borehole) does not cause separation of the lower end 117 of the mating sleeve 110 and the interior shoulder 127 of the shaft sleeve 120. For example, in one exemplary embodiment, mating sleeve 110 may be tightened with a torque of about 26,000 foot-pounds (although the invention is not limited in this regard). After mating sleeve 110 is tightened to shaft sleeve 120, center sleeve 130 (along with one or more optional sealing sleeves 132) is deployed between and rotational engaged with cylindrical shaft 220 and mating sleeve 110 as described in more detail with respect to FIG. 4.

Figure 4:
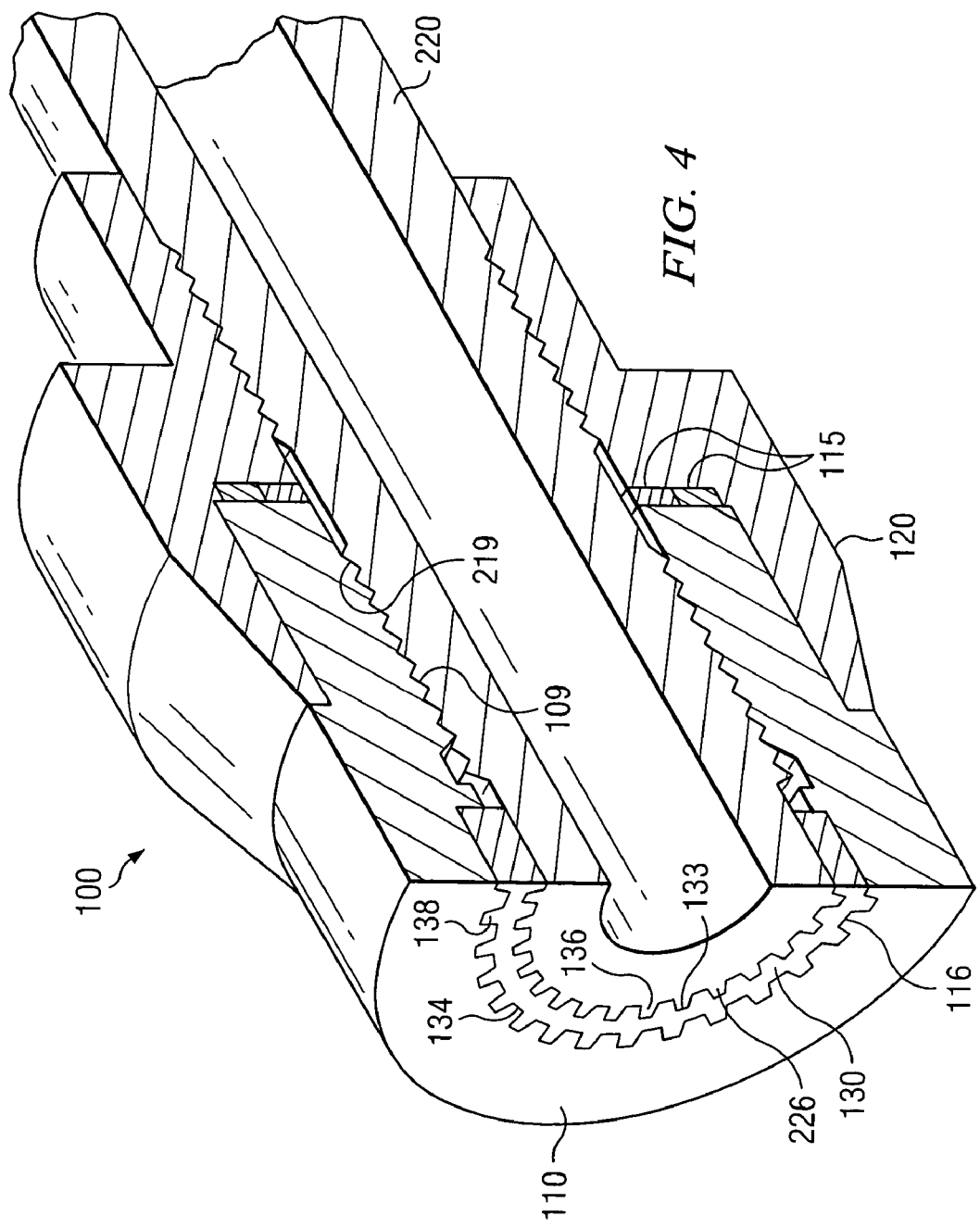
FIG. 4 is a cross sectional view as shown on FIG. 3.

Turning now to FIG. 4, the engagement between cylindrical shaft 220, center sleeve 130, and mating sleeve 110 is described in more detail. As shown in FIG. 4 (and as described briefly above), center sleeve 130 includes a plurality of radial splines 136 on an inner surface 133 thereof sized and shaped to engage radial splines 226 on an outer surface of cylindrical shaft 220. Center sleeve 130 further includes a plurality of radial splines 138 on an outer surface 134 thereof sized and shaped to engage radial splines 116 on an inner surface of mating sleeve 110. As shown, center sleeve 130 rotationally couples mating sleeve 110 to cylindrical shaft 220. As such, use of center sleeve 130 advantageously reduces make up torque requirements, since torsional loads are supported by the radial splines 136, 226, 138, and 116 rather than frictional forces on threads 109 and 219. As described above, the make up torque is intended simply to support bending loads. Thus, as described above, the torque requirement is typically less than that for a threaded connection required to withstand both torsional and bending loads through the threads and shoulder.

In certain advantageous embodiments, center sleeve 130 includes a different number of inner 136 and outer 138 splines. For example, there may be one or two more inner splines 136 than outer splines 138 (or conversely one or two more outer splines 138 than inner splines 136). In such exemplary embodiments, the inner 136 and outer 138 splines are circumferentially offset from one another with the degree of circumferential offset varying about the circumference of the tool. During assembly of the connection, the center sleeve 130 is typically rotated (about axis 60) until the inner 136 and outer 138 splines line up with splines 226 and 116 respectively. The center sleeve may then be inserted between mating sleeve 110 and shaft 220 such that splines 136 engage splines 226 and splines 138 engage splines 116. It will be appreciated that for embodiments in which the difference between the number of splines on the inner 133 and outer 134 surfaces of the center sleeve 130 is a single spline, there is one unique rotary position at which the center sleeve may be inserted between the connection sleeve 110 and the shaft 220. For embodiments in which the difference is two splines, the center sleeve may be inserted at two rotary positions offset from one another by 180 degrees.

In the exemplary embodiment shown on FIG. 4, center sleeve 130 includes 30 radial splines 136 on inner surface 133 and 29 radial splines 138 on outer surface 134 (although it will be appreciated that the invention is not limited to any particular number of splines 136 and 138). As such, it will be appreciated the center sleeve 130 may possibly be engaged between the mating sleeve 110 and the shaft 220 at one of 870 (29 times 30) unique rotary positions. Since there is a discrete number of circumferential positions (870 in the embodiment shown on FIG. 4, which corresponds to a circumferential spacing of 0.41 degrees, i.e., 360 divided by 870) it may be advantageous in certain embodiments to fabricate splines 136, 226, 138, and 116 such that they engage one another with a predetermined clearance. Such clearance is intended to assure that there is at least one rotary position at which the center sleeve 130 may be engaged between the mating sleeve 110 and the shaft 220. For example a connection in which center sleeve 130 has a 4¾ inch outer diameter and a clearance of 0.020 inches between each pair of mating splines (splines 136 and 226 and splines 138 and 116) allows for about 0.96 degrees of circumferential movement. Such clearance is greater than the spacing of the circumferential positions (0.41 degrees) and is therefore sufficient to enable the center sleeve 130 to engage with the mating sleeve 110 and cylindrical shaft 220 in at least one and as many as three sequential circumferential positions. It will be appreciated that this invention is not limited to any particular number of radial splines, nor to any particular clearance between the various mating splines when such clearance is provided.

It will be appreciated that embodiments of this invention may be utilized on opposing ends of a shaft on a downhole tool. In particular, embodiments of this invention may be advantageously utilized on opposing ends of a rotatable shaft in a downhole steering tool (such as steering tool 200 shown on FIG. 3). It will be appreciated that embodiments of this invention obviate the need for upsets at one end of the shaft for increasing torque and bending moment load capacity. As such, the tool may be advantageously assembled and disassembled from either end so that the seals, seal housings, bearings, and other such components may be replaced without requiring complete disassembly of the tool, thereby simplifying maintenance procedures. Further, as described above, the make up torque requirements are reduced at both ends of the shaft (as compared to the prior art), thereby advantageously increasing the torsional and bending load capacity of the shaft.

Although the present invention and its advantages have been described in detail, it should be understood that various changes, substitutions and alternations can be made herein without departing from the spirit and scope of the invention as defined by the appended claims.

I claim:

1. A connector assembly for connecting with a rotatable shaft having a cylindrical axis, the shaft further including a plurality of radial splines formed on an outer surface thereof, the connector assembly comprising:
a mating sleeve having longitudinally opposed ends, the mating sleeve including a plurality of radial splines formed on an inner surface thereof, the mating sleeve further including threads on an inner surface thereof for coupling with a threaded outer surface of the shaft; and
a center sleeve sized and shaped for deployment between the shaft and the mating sleeve, the center sleeve including a first plurality of radial splines formed on an inner surface thereof, the first plurality of radial splines sized and shaped for engagement with the plurality of splines on the shaft, the center sleeve further including a second plurality of radial splines formed on an outer surface thereof, the second plurality of radial splines sized and shaped for engagement with the plurality of splines on the mating sleeve.

2. The connector assembly of claim 1, further comprising a shaft sleeve threadably coupleable with the shaft, the mating sleeve being configured to tighten against the shaft sleeve when threadably coupled to the shaft.

3. The connector assembly of claim 2, wherein the shaft sleeve includes an enlarged counter bore, a portion of the mating sleeve deployable in the counter bore.

4. The connector assembly of claim 3, further comprising at least one compression sleeve deployable between the portion of the mating sleeve deployable in the counter bore and a shoulder portion of the shaft sleeve, the mating sleeve being configured to tighten against the at least one compression sleeve.

5. The connector assembly of claim 1, wherein the center sleeve includes a different number of splines on the inner surface than on the outer surface thereof.

6. The connector assembly of claim 5, wherein said difference between the number of splines on the inner surface and the outer surface of the center sleeve is a number of splines selected from the group consisting of one and two.

7. The connector assembly of claim 5, wherein:
the first plurality of splines on the center sleeve and the plurality of splines on the shaft are sized and shaped such that there is a clearance therebetween upon engagement with one another; and
the second plurality of splines on the center sleeve and the plurality of splines on the mating sleeve are sized and shaped such that there is a clearance therebetween upon engagement with one another.

8. The connector assembly of claim 1, further comprising a sealing sleeve coupled to the center sleeve, the sealing sleeve including a plurality of sealing rings, the sealing sleeve being disposed to provide a seal between the shaft and the mating sleeve.

9. The connector assembly of claim 1, wherein one end of the mating sleeve is coupleable with a drill string.

10. The connector assembly of claim 1, wherein one end of the mating sleeve includes a threaded connection selected from the group consisting of a threaded box end and a threaded pin end.

11. A downhole assembly comprising:
a downhole tool including a rotatable shaft rotatably deployed within a downhole tool body, the shaft disposed to rotate relative to the tool body, the shaft including a plurality of splines extending radially outward from an outer surface thereof; and
a connector assembly coupled to the shaft, the connector assembly including (i) a mating sleeve threadably coupled with the shaft, the mating sleeve including a plurality of splines extending radially inward from an inner surface thereof, and (ii) a center sleeve including a first plurality of radial splines formed on an inner surface thereof, the first plurality of radial splines engaged with the plurality of splines on the outer surface of the shaft, the center sleeve further including a second plurality of radial splines formed on an outer surface thereof, the second plurality of radial splines engaged with the plurality of splines on the inner surface of the mating sleeve.

12. The assembly of claim 11, wherein the connector assembly further comprises (iii) a shaft sleeve threadably coupled with the shaft, the mating sleeve tightened against the shaft sleeve.

13. The assembly of claim 12, wherein the shaft sleeve includes an enlarged counter bore, a portion of the mating sleeve deployed in the counter bore.

14. The assembly of claim 11, wherein the center sleeve includes a different number of splines on the inner surface than on the outer surface thereof.

15. The assembly of claim 14, wherein said difference between the number splines on the inner surface and the outer surface of the center sleeve is a number of splines selected from the group consisting of one and two.

16. The assembly of claim 11, wherein:
the first plurality of splines on the center sleeve and the plurality of splines on the shaft are sized and shaped such that there is a clearance therebetween; and
the second plurality of splines on the center sleeve and the plurality of splines on the mating sleeve are sized and shaped such that there is a clearance therebetween.

17. A downhole tool comprising:
a rotatable shaft rotatably deployed within a downhole tool body, the shaft disposed to rotate relative to the tool body, the shaft including a plurality of splines extending radially outward from an outer surface thereof;

a mating sleeve threadably coupled with the shaft, the mating sleeve having longitudinally opposed ends, the mating sleeve including a plurality of splines extending radially inward from an inner surface thereof; and a center sleeve including a first plurality of radial splines formed on an inner surface thereof, the first plurality of radial splines sized and shaped for engagement with the plurality of splines on the outer surface of the shaft, the center sleeve further including a second plurality of radial splines formed on an outer surface thereof, the second plurality of radial splines sized and shaped for engagement with the plurality of splines on the inner surface of the mating sleeve.

18. The downhole tool of claim 17, further comprising a shaft sleeve threadably coupled with the shaft, the mating sleeve being tightened against the shaft sleeve.

19. The downhole tool of claim 18, wherein the shaft sleeve includes an enlarged counter bore, a portion of the mating sleeve deployed in the counter bore.

20. The downhole tool of claim 17, further comprising:
a shaft sleeve threadably coupled with the shaft, the shaft sleeve including an enlarged counter bore;
a portion of the mating sleeve deployed in the counter bore; and
at least one compression sleeve deployed between the portion of the mating sleeve deployed in the counter bore and a shoulder portion of the shaft sleeve, the mating sleeve being tightened against the at least one compression sleeve.

21. The downhole tool of claim 17, wherein the center sleeve includes a different number of splines on the inner surface than on the outer surface thereof.

22. The downhole tool of claim 21, wherein said difference between the number of splines on the inner surface and the outer surface of the center sleeve is a number of splines selected from the group consisting of one and two.

23. The downhole tool of claim 17, further comprising a sealing sleeve coupled to the center sleeve, the sealing sleeve including a plurality of sealing rings, the sealing sleeve being disposed to provide a seal between the shaft and the mating sleeve.

24. The downhole tool of claim 17, wherein one end of the mating sleeve is coupleable with a drill string.

25. The downhole tool of claim 24, wherein the end of the mating sleeve coupleable with a drill string includes a threaded connection selected from the group consisting of a threaded box end and a threaded pin end.

26. A downhole steering tool comprising:
a rotatable shaft rotatably deployed within a steering tool body, the shaft disposed to rotate relative to the steering tool body, the shaft having longitudinally opposed first and second ends, each of said ends providing a plurality of shaft splines extending radially outward from an outer surface of the shaft; and first and second connector assemblies, one each of the connector assemblies connected to a corresponding one of the ends of the shaft, each connector assembly comprising:
a shaft sleeve threadably coupled to the end of the shaft;
a mating sleeve also threadably coupled the end of the shaft and tightened against the shaft sleeve, the mating sleeve further including a plurality of mating sleeve splines extending radially inward from an inner surface thereof;
a center sleeve also received on the end of the shaft via splined engagement with the shaft splines, the center sleeve including a plurality of inner radial splines formed on an inner surface thereof, the inner radial splines sized and shaped for engagement with the shaft splines, the center sleeve further including a plurality of outer radial splines formed on an outer surface thereof, the outer radial splines sized and shaped for engagement with the mating sleeve splines; and the mating sleeve further received on the center sleeve via splined engagement between the mating sleeve splines and the outer radial splines of the center sleeve.

27. The downhole steering tool of claim 26, wherein at least one of the connector assemblies comprises:
the shaft sleeve further including an enlarged counter bore, a portion of the mating sleeve deployed in the counter bore.

28. The downhole steering tool of claim 27, wherein said at least one of the connector assemblies yet further comprises:
at least one compression sleeve deployed in the counter bore, the at least one compression sleeve deployed between a shoulder portion of the shaft sleeve and the portion of the mating sleeve deployed in the counter bore, the mating sleeve being tightened against the at least one compression sleeve.

29. The downhole steering tool of claim 26, wherein at least one of the connector assemblies further comprises:
the center sleeves providing a different number of inner radial splines and outer radial splines.

30. The downhole steering tool of claim 29, wherein the difference between the number of inner radial splines and outer radial splines is a number of splines selected from the group consisting of one and two.

31. The downhole steering tool of claim 26, wherein the mating sleeve in the first connector assembly is also coupleable with a drill string, and the mating sleeve in the second connector assembly is also coupleable with a drill bit assembly.

32. The downhole steering tool of claim 26, wherein the mating sleeve in the first connector assembly is also threadably coupleable with a drill string, and the mating sleeve in the second connector assembly is also threadably coupleable with a drill bit assembly.

33. The downhole steering tool of claim 26, further comprising first and second bearing assemblies each deployed between the shaft and the housing at a corresponding one of the first and second ends, and wherein, at each end, the shaft sleeve is threadably tightened against the bearing assembly, said tightening disposed to secure bearings within the bearing assembly between the shaft sleeve and a shoulder portions provided on the shaft.

34. A method for coupling a downhole tool to a drill string, the method comprising:
(a) providing a downhole tool including a rotatable shaft deployed in a substantially non-rotating tool body, the shaft disposed to rotate relative to the tool body, the rotatable shaft including a plurality of radial splines formed on an outer surface thereof;
(b) threading a mating sleeve to the shaft, the mating sleeve including a plurality of radial splines formed on an inner surface thereof; and
(c) deploying a center sleeve between the shaft and the mating sleeve, the center sleeve being rotatably coupled to the shaft and the mating sleeve, the center sleeve including a first plurality of radial splines formed on an inner surface thereof, the first plurality of radial splines engaged with the plurality of splines on the shaft, the center sleeve further including a second plurality of radial splines formed on an outer surface thereof, the second plurality of radial splines engaged with the plurality of splines on the mating sleeve.

* * * * *